Figure 1:
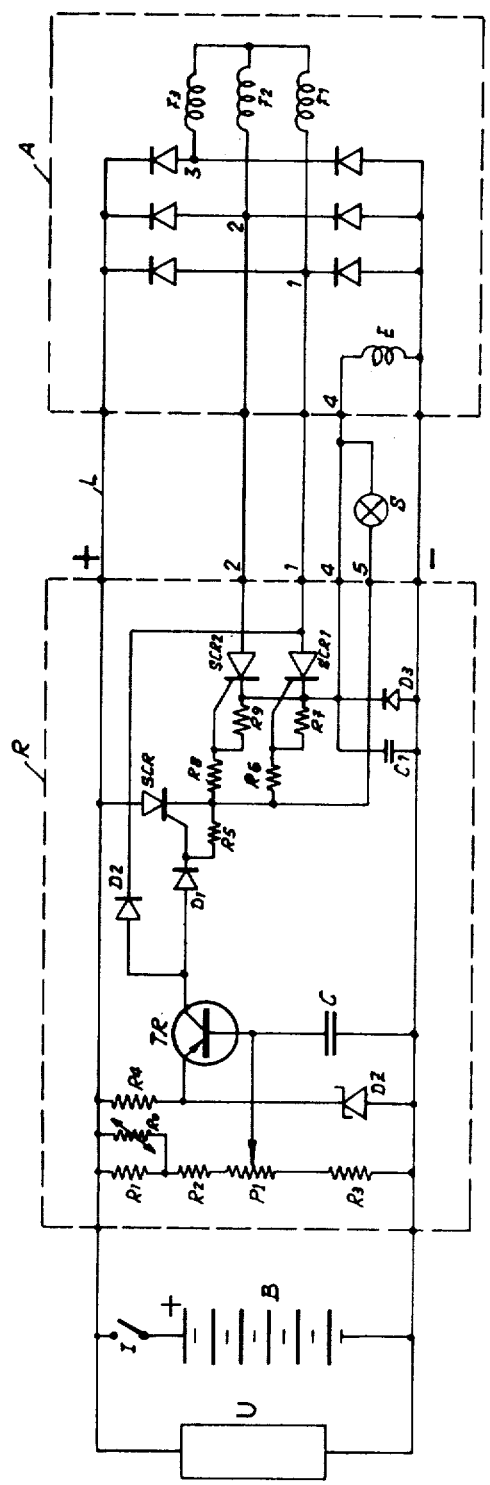

United States Patent
Basso et al.

[15] 3,701,000
[45] Oct. 24, 1972

[54] ELECTRONIC DEVICE FOR REGULATING THE VOLTAGE OF ALTERNATORS, PARTICULARLY FOR MOTOR VEHICLES

[72] Inventors: Eugenio Basso, Levico; Guglielmo Ravaschio, Genova; Vittorio Frangilli, Gallarate, all of Italy

[73] Assignee: Fabbrica Italiana Magneti Marelli S.p.A., Milano, Italy

[22] Filed: April 8, 1971

[21] Appl. No.: 132,515

[30] Foreign Application Priority Data

April 11, 1970 Italy...................23183 A/70

[52] U.S. Cl. ..........................320/64, 322/28, 322/99
[51] Int. Cl. .............................................H02p 9/30
[58] Field of Search..........320/39, 40, 48, 59, 61, 69, 320/60; 322/28, 99

[56] References Cited
UNITED STATES PATENTS 3,568,041   3/1971   Arakane.................320/048 X

*Primary Examiner*—J. P. Miller
*Assistant Examiner*—Robert J. Hickey
*Attorney*—Ostrolenk, Faber, Gerb & Soffen

[57] ABSTRACT

An alternator for a motor vehicle is provided with an electronic device for regulating output voltage. The field winding of the alternator is energized through a power circuit controlled by an SCR triggered by a control circuit when voltage drops below a preset value. The triggering signal to the SCR and initial flow in the field winding through the SCR is governed by the control circuit. Initial current flow in the field winding also takes place through an indicator lamp connected for battery recharging. The control circuit output applied to the SCR is also connected through a diode to the anode of a medium power SCR connected to one phase of the alternator.

2 Claims, 3 Drawing Figures

INVENTORS
EUGENIO BASSO
GUGLIELMO RAVASCHIO
VICTORIO FRANGILLI
by Ostrolenk, Faber, Gerb & Soffen
ATTORNEYS

ELECTRONIC DEVICE FOR REGULATING THE VOLTAGE OF ALTERNATORS, PARTICULARLY FOR MOTOR VEHICLES

This invention relates to improvements in electronic circuits for regulating the voltage of alternators, particularly for motor-vehicles, wherein the field winding is supplied by the alternator through a power circuit controlled by a silicon controlled rectifier (SCR), the latter being triggered by a signal from a control circuit when the line voltage drops below a predetermined value.

In such known regulating circuits, the silicon controlled rectifier is connected in the power circuit, whereby this SCR should be a power silicon controlled rectifier with the accompanying disadvantages in cost and dissipated energy.

Moreover, in these circuits, in order that the alternator may deliver power at the initial stages of its operation, the alternator field winding is initially supplied by the battery through a circuit including a resistor which, however, remains connected during the normal operation of the regulator, thus causing an unnecessary power dissipation.

Therefore, these regulators are subjected to substantial heating, thereby requiring housings fitted with cooling fins or other expedients in order to assure an effective heat dissipation to the outside. Of course, this will increase the bulk of these devices in addition to the cost thereof.

It should also be noted that conventional regulating devices require the provision of a further special circuit to obtain a signalling for battery recharging and possible field winding short-circuits.

It is the object of the present invention to provide an improved voltage regulating circuit avoiding the above-mentioned disadvantages.

According to the invention, this is accomplished by a circuit wherein said silicon controlled rectifier (SCR) is used only to supply the control signal to the power circuit and the initial current to the field winding. Accordingly, due to low currents being involved, this SCR may be a low power silicon controlled rectifier.

The power circuit consists of power lines connecting all or some alternator phases with the field winding through a corresponding medium power silicon controlled rectifier controlled by said low power SCR.

According to a very important aspect of the invention, the initial energization of the field winding and signalling for battery recharging and short-circuits in field winding can be provided through an indicator lamp simply connected between the lower power SCR and field winding.

Figure 2:
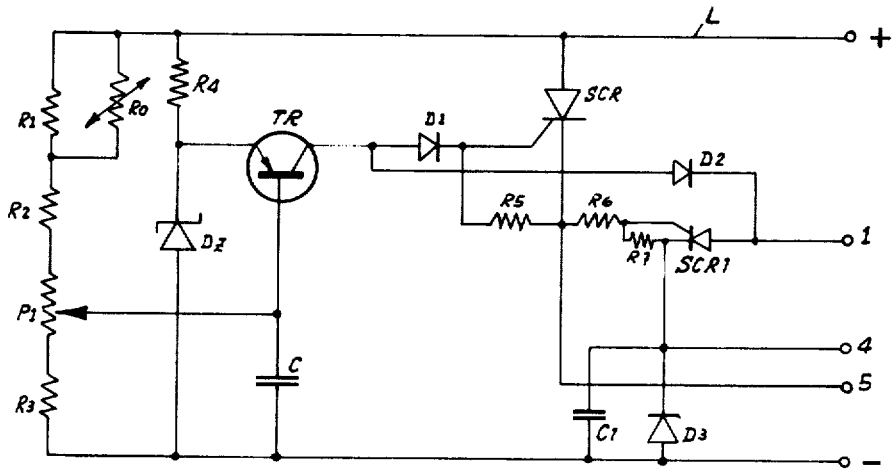
Figure 3:
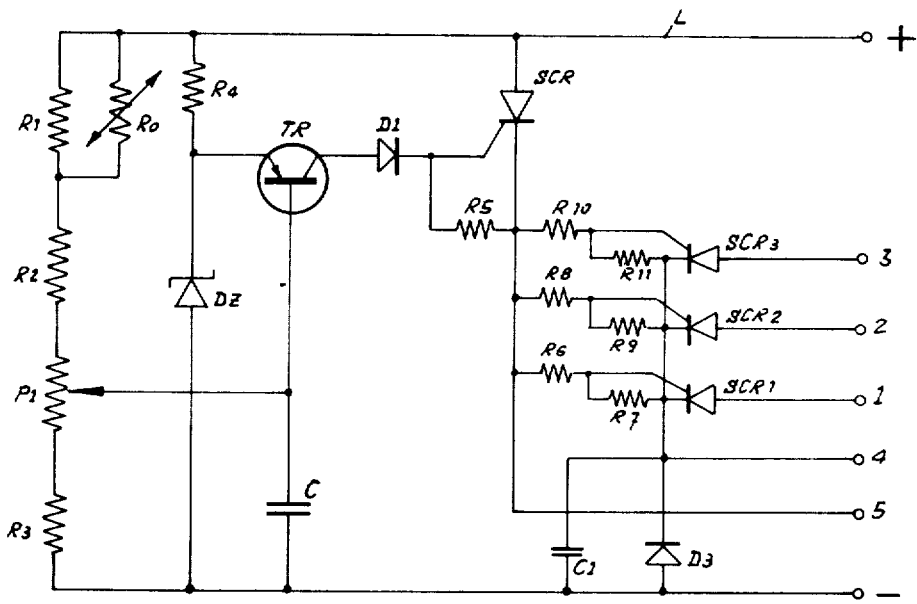

Further advantages and features of the invention will become apparent from the following description as referred to the appended drawings showing, by mere way of not limiting example, some preferred embodiments of the voltage regulator, and more particularly:

FIG. 1 shows the battery recharging wiring diagram comprising a three-phase alternator provided with a voltage regulating circuit in accordance with the invention; and FIGS. 2 and 3 are two modified forms of the regulating circuit shown in FIG. 1.

Referring to FIG. 1 showing a battery recharging circuit arrangement particularly suited for motor-vehicles, the following elements are respectively designated: alternator A, battery B, utilizing circuit U and voltage regulating circuit R in accordance with the invention.

The alternator is a three-phase alternator, the stator windings of which are star connected. However, it is apparent that the alternator may be a three-phase alternator having delta stator windings, or single- or two-phase alternator, etc. $F_1$, $F_2$ and $F_3$ are the windings for the three phases, numerals 1, 2 and 3 are the three outputs connected through a three-phase rectifier bridge to line L, and E is the field or exciting winding of the alternator.

The voltage regulator R in FIG. 1 utilizes two phases of the alternator, but whichever is the number of utilized phases, it typically comprises three portions hereinafter indicated with reference to the embodiment shown:

1. a low-power control section responsive to line voltage and comprising in a per se known manner a resistive divider $R_1/R_0$, $R_2$, $P_1$ and $R_3$ and transistor TR, the emitter of which is connected through $R_4$ to line L and through Zener diode DZ to ground for voltage stabilization;

2. a control section for the power circuit comprising the silicon controlled rectifier SCR, controlled through diode $D_1$, and the set of resistors $R_5$, $R_6$, $R_7$, $R_8$ and $R_9$; and finally 3. a power section or circuit comprising the silicon controlled rectifiers $SCR_1$ and $SCR_2$ connected in the circuits connecting the alternator phases with the field winding E, and diode $D_3$.

The low power control section may be other than that shown provided that it is capable of triggering the silicon controlled rectifier SCR when the voltage on line L drops below a predetermined value.

In the diagram, the two power circuits are supplied by the alternator phases $F_1$ and $F_2$ and the corresponding silicon controlled rectifiers $SCR_1$ and $SCR_2$ are connected through their anodes to the outputs 1 and 2 of said phases $F_1$ and $F_2$ and through their cathodes to terminal 4 of field winding E. The control gates of said silicon controlled rectifiers SCR1 and SCR2 are then connected to the SCR cathode through resistors $R_6$ and $R_8$, respectively.

From the foregoing, it will be appreciated that only the very low currents for triggering diodes $SCR_1$ and $SCR_2$ and initially supplying the field winding E flow through SCR.

Therefore, SCR is a low power silicon controlled rectifier with evident advantages in cost and dissipated power which are reduced. It is also apparent that said winding E is supplied by a plurality of power lines controlled by SCR. Thus, moderate or medium power silicon controlled rectifiers as $SCR_1$ and $SCR_2$ can be used also for such lines.

A further highly significant feature of the regulating circuit according to the invention consists of combining the battery recharging and short-circuits winding E signalling circuit.

For this signalling, it is only needed to connect an indicator lamp S between terminal 5 connected to the cathode of SCR and terminal 4 of winding E, as shown in the diagram. Through the connection of this lamp a further flow is developed for initial supply current to winding E provided by battery B through SCR. The charging indicator circuit is completed by diode $D_2$, the anode of which is connected to the output for the low power control section and more particularly to the collector of TR, and the cathode of which is connected to the anode of the silicon controlled rectifier of the power circuit which is the first to become conductive. Phase $F_1$ is assumed to be the first conductive phase and, therefore, the anode of $SCR_1$ is connected to the $D_2$ cathode.

As set forth in the following, any flashings of lamp S are avoided by $D_2$ during normal operation of the regulator.

The operation of the regulating circuit R in FIG. 1 will now be described.

When switch I is closed, and the alternator is stationary, the battery has a lower voltage than the regulator setting voltage, which may be adjusted by means of potentiometer $P_1$. The base of transistor TR is then at a lower potential than that of the emitter, as stabilized by Zener diode $D_z$, and therefore said transistor becomes conductive. Then, a signal is applied through the decoupling diode D1 to the "gate" electrode of SCR, causing the latter to be triggered.

Upon SCR being conductive, a low current is supplied to the field winding E both through $R_6$–$R_7$ and $R_8$–$R_9$ and through the indicator lamp S, if any, which lights, signalling that the battery B is supplying current. Moreover, sufficient voltages are present on the gates of $SCR_1$ and $SCR_2$ for causing the triggering thereof.

After starting and as soon as the alternator rotor has attained a sufficient speed, alternating voltages appear on the anodes of $SCR_1$ and $SCR_2$ as generated by the phases $F_1$ and $F_2$ rendering these silicon controlled rectifiers conductive, the latter thus beginning to supply current to the field winding E. As excitation increases, the rectified output voltage of the alternator on line L is increased until it exceeds the battery voltage and attains the predetermined setting value.

At this time, the conduction of SCR stops, since two identical voltages appear on the anode and cathode and, therefore, the indicator lamp is switched off.

On the other hand, when the setting voltage has been attained and as the base of TR is at a higher voltage than the emitter, the collector current is zero and, as a result, the signal on the "gate" of SCR is removed.

Due to the 120° phase shift of the two voltage waves applied to the anodes of $SCR_1$ and $SCR_2$ and since $SCR_1$ is the first to become conductive, as above assumed, in the absence of biasing on the "gate" of said diodes, and as soon as the voltage on the anode of $SCR_2$ is zero, the current supply to the field winding E will be fully interrupted, thus causing the output voltage on line L to drop almost immediately. This voltage drop will cause the re-operation of the low power control section, enabling the medium power elements $SCR_1$, $SCR_2$ to conduct for re-energizing the field winding.

The repetition of this cylce, with times depending on the load conditions of the utilizing circuit and the engine speed, will regulate the average level of the excitation current and stabilize the output voltage to the pre-set value.

As above stated, when the generator supplies current, the indicator lamp is connected between two points, the potential of which is identical or zero, thereby evidently causing the switching off thereof.

However, for the correct operation of the lamp the diode D2 is essential. Thus, it will be seen that when $SCR_1$ and $SCR_2$ are conductive, the associated voltage waveforms with respect to ground, at the output of the generator phases and hence also on the cathodes of said silicon controlled rectifiers are 120° phase shifted.

Accordingly, for some fraction of a period, there will be no voltage on the field winding E. Therefore, at this fraction, SCR could be enabled to conduct by the control circuit, should the line voltage be below the pre-set value, thus supplying the indicator lamp. On the contrary, by connecting the diode $D_2$, SCR is cut off during this short time interval, by by-passing to ground the signal applied on its "gate", thus preventing the lamp supplying circuit from being re-closed. Said lamp S also indicates short-circuits occurring in winding E. Thus, when such a condition occurs, terminal 4 is grounded, while terminal 5 is at line voltage and, therefore, lamp S is switched on.

Some components aiding in good operation of the regulator are also shown in the diagram of FIG. 1. The negative temperature coefficient resistor Ro is for accommodating the value of the regulated line voltage to the battery requirements.

The comparatively high rate capacitor C provides a time constant to the control circuit so as to render it unaffected by the changes at high frequency in the line voltage.

Diode $D_3$ is for shorting to ground the negative overvoltages on the field winding which may be built up upon current interruption therein. Capacitor $C_1$ is for reducing the slope of the field winding transients.

The circuit and operation for the regulator in FIG. 1, using only two phases of the alternator for supplying the winding E, have been described.

It is apparent that the foregoing substantially applies also to the regulators in FIGS. 2 and 3, relating to the use of one phase only or all three phases of the alternator, respectively.

It will be seen that in the diagram of FIG. 3 the diode $D_2$ is omitted; the omission of this component is possible since the use of all three phases of the alternator causes a voltage, which is substantially the same as line voltage, to be applied on the field winding during the full wave period.

The invention has been shown in connection with some particular circuits, but it is evident that all the equivalent solutions or possible modifications and changes in the circuits as necessary in accordance with practical requirements are within the spirit of the invention.

The embodiments of the invention in which an exclusive privilege or property is claimed are defined as follows.

1. Electronic apparatus for controlling a multiphase alternator having a field winding and a plurality of stator windings and a field winding, said apparatus comprising:
   a pilot lamp and a first silicon controlled rectifier connected in series with said field winding and the output of said alternator;
   a voltage supply comprising a battery coupled to said alternator;
   a control section coupled between said voltage supply and said first silicon controlled rectifier and responsive to changes in said voltage supply for triggering the operation of said first silicon controlled rectifier;

at least two supply lines coupled to said stator windings;

a plurality of second silicon controlled rectifiers, each having their outputs coupled to an associated supply line and having their inputs coupled in common to said field winding;

each of said plurality of silicon controlled rectifiers having control electrodes; said control electrodes being coupled in common to said first silicon controlled rectifier;

said first silicon controlled rectifier having a control electrode;

said control section including a low power rating transistor for coupled to the control electrode of said first silicon controlled rectifier whereby said first silicon controlled rectifier significantly reduces the current output of said transistor.

2. An electronic device as claimed in claim 1, wherein the amount of supply lines connecting the alternator to the field winding is less than the amount of alternator phases, and further comprising diode means coupled between said control section transistor and the connection between one of said plurality of silicon controlled rectifiers and its associated supply line of the stator winding which is the first to conduct.

* * * * *